United States Patent [19]

Krüger et al.

[11] Patent Number: 4,529,272
[45] Date of Patent: Jul. 16, 1985

[54] LIQUID-CRYSTAL DISPLAY WITH REDUCED REFLECTION

[75] Inventors: Hans Krüger, Munich, Fed. Rep. of Germany; Frans Leenhouts, Lenzburg, Switzerland

[73] Assignee: Siemens Aktiengesellschaft, Berlin and Munich, Fed. Rep. of Germany

[21] Appl. No.: 416,086

[22] Filed: Sep. 8, 1982

[30] Foreign Application Priority Data

Sep. 18, 1981 [DE] Fed. Rep. of Germany ....... 3137229

[51] Int. Cl.$^3$ ............................................. G02F 1/133
[52] U.S. Cl. ................................................. 350/339 R
[58] Field of Search ................... 350/339 R, 341, 338, 350/166

[56] References Cited

U.S. PATENT DOCUMENTS 3,736,047  5/1973  Gelber et al. ............... 350/339 R X
4,248,502  2/1981  Bechteler et al. .......... 350/339 R X

FOREIGN PATENT DOCUMENTS 2852395  of 0000  Fed. Rep. of Germany .
5348541  of 0000  Japan .
0049923  3/1982  Japan ..................... 350/338

OTHER PUBLICATIONS

Heavens, *Optical Properties of Thin Solid Films* Butterworths Scientific Publications, London 1955, pp. 113-116.

Abstract of Publication P.A.J., vol. 2, No. 81, dd 7-8-78, 3615.

Primary Examiner—John K. Corbin
Assistant Examiner—David Lewis
Attorney, Agent, or Firm—Herbert L. Lerner; Laurence A. Greenberg

[57] ABSTRACT

A liquid crystal display with a liquid crystal layer enclosed by two parallel plates which carry electrodes and on top thereof a first layer system of several dielectric electrodes having refractive indices smaller than 2.2 and a thickness of the layers above the base layer, under 200 nm. The liquid crystal display is characterized by the following features with respect to the first carrier plate.

the electrode has a thickness $d_e$, within the range according to $0 < d_e \leq 30$ nm or $(m\lambda/2n_e - 10)$ nm $\leq d_e \leq (m\lambda/2n_e + 10)$ nm ($\lambda = 550$ nm, m = natural integer > 0, $n_e$ = index of refraction of the electrode, nm = nanometer), the base layer has an index of refraction $n_b$ and a thickness $d_b$, within the range according to $1.40 \leq n_b \leq 1.50$ and 20 nm $\leq d_b \leq 50$ nm or $(m\ 300/n_b - 20)$ nm $\leq d_b \leq (m\ 300/n_b + 20)$ nm, the remaining layers of the first layer system have indices of refraction $n_i$ and a total thickness $d_{s1-b}$ according to $1.60 \leq n_i \leq 1.70$ and 20 nm $\leq d_{s1-b} < 70$ nm and the orientation layer which is the uppermost layer of the first layer system aligns the adjacent liquid-crystal molecules.

11 Claims, 1 Drawing Figure

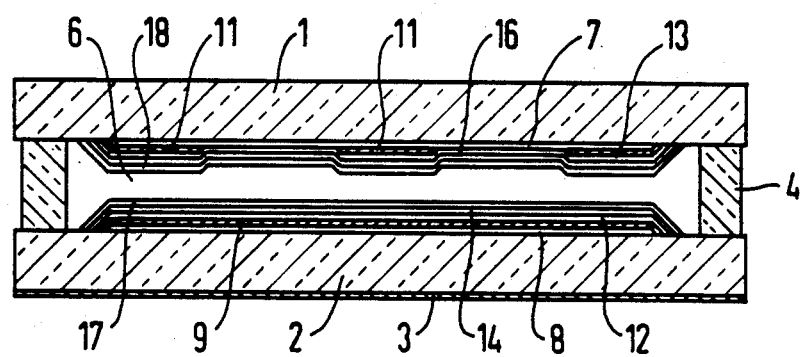

LIQUID-CRYSTAL DISPLAY WITH REDUCED REFLECTION

BACKGROUND OF THE INVENTION

1. Field of the Invention

This invention relates to a liquid crystal display with a liquid crystal layer enclosed by two parallel carrier plates which carry on their facing surfaces electrically conductive coatings as electrodes and a system of dielectric layers.

2. Description of the Prior Art

German Published Non-Prosecuted Application No. DE-OS 28 52 395 describes such a display.

The two plates of a liquid-crystal cell normally support a system of several stacked-up films of different optical density. Such a multiple layer reflects part of the incident light which, if it is not suppressed, is noted as an optical disturbance and decreases the contrast ratio. It has been found in practice that it is not easy to reduce the reflection of the display in an acceptable manner. The reasons for this are, in particular, difficulties in making the display area with low reflection over the electrodes as well as in the remaining area, and this problem must be solved with the least possible expenditure, since liquid-crystal displays have become mass-produced articles and their production has come under considerable cost pressure.

The Offenlegungsschrift No. 28 52 395 cited above describes a type of cell, in which the two substrates carry on top of the electrodes at least one inorganic film. Each film has an index of refraction of between 1.5 and 2.2 at a wavelength of 590 nm, has a thickness of between 50 nm and 200 nm and otherwise must be optimized by means of the Fresnel formulas. Such coating is rather attractive from a cost aspect, since the electrode must normally be coated with an electrically insulating as well as with an orientation layer. However, it has been found that the mentioned material information is still too general; it is not sufficient to eliminate cell reflections in the case of any desired given material and thickness values for the substrate, the conductive layer and the liquid crystal without further measures. Particularly confusing is the situation if the display operates with unpolarized light instead of polarized light, because the birefringent liquid-crystal layer has different indices of refraction for differently polarized rays, a circumstance which has not been taken into consideration in the formerly used optimizing calculations.

In the Japanese patent application No. 53-48 541, an interference-suppressed optical liquid crystal display is described, in which the transparent electrodes have an optical thickness of about $\lambda/2$ or $\lambda$, are optically denser than their substrate and are coated with an $SiO_2$-layer which in turn is coated with an SiO orientation layer. With this kind of coating, which likewise does not call for additional antireflection coating, acceptable results are obtained only if the prescribed electrode thickness is kept precisely, and even then a trace of color is sometimes still noticeable.

SUMMARY OF THE INVENTION

It is therefore an object of the invention to provide a liquid-crystal display which is dereflected almost perfectly on its entire imaging surface, and also specifically and particularly with unpolarized radiation. The liquid crystal display can be manufactured efficiently and economically. The layer materials and thicknesses may be selected freely within relatively wide limits.

With the foregoing and other objects in view, there is provided in accordance with the invention, a liquid-crystal display with (1) a liquid-crystal layer enclosed by (2) two mutually parallel spaced-apart carrier plates which (3) carry electrically conductive coatings as electrodes on the surfaces of the two plates facing each other, with at least one of the two carrier plates designated first carrier plate provided with (4a) several separately addressable electrodes, and on top thereof (4b) with a first layer system of several dielectric layers, the refraction indices of which have values smaller than 2.2 and the thicknesses of which are, at least in the case of the layers above the lowest layer designated "base layer", under 200 nm, the combination therewith wherein at least in the first carrier plate (4c) the electrode has a thickness $d_e$, within the ranges according to $0 < d_e \leq 30$ nm or $(m\lambda/2n_e - 10)$ nm $\leq d_e \leq (m\lambda/2n_e + 10)$ nm ($\lambda = 550$ nm, m = natural integer > 0, $n_e$ = index of refraction of the electrode, nm = nanometer), (4d) the base layer has an index of refraction $n_b$ and a thickness $d_b$, within the ranges according to $1.40 \leq n_b \leq 1.50$ and $20$ nm $\leq d_b \leq 50$ nm or (m $300/n_b - 20$) nm $\leq d_b \leq$ (m $300/n_b + 20$) nm, (4e) the remaining layers of the first layer system have indices of refraction $n_i$ and a total thickness $d_{sl-b}$ according to $1.60 \leq n_i \leq 1.70$ and $20$ nm $\leq d_{sl-b} \leq 70$ nm and (4f) the orientation layer which is the uppermost layer of the first layer system aligns the adjacent liquid-crystal molecules.

Other features which are considered as characteristic for the invention are set forth in the appended claims.

Although the invention is illustrated and described herein as embodied in liquid-crystal display with reduced reflection, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates in cross section a liquid crystal display in which two parallel plates made of sodium silicate glass, refractive index 1.48, spaced by a frame forms a cavity containing a liquid crystal layer consisting of a neumatic carrier with a chiral additive. The front plate surface has separately addressable segment electrodes and the rear plate has a continuous conductive layer as electrode. The electrodes are an $In_2O_3/SnO_2$ alloy with a refractive index of 2.0 and 30 nm thick. The surfaces of the plates beneath the electrodes are covered with a protective layer made of quartz or other $SiO_2$ with an optical density of 1.46 and a thickness of 140 nm, and the top of the electrodes are covered with an insulating layer about 35 nm thick. Both layers are of the same material. Above the insulating layer is an intermediate layer of $Al_2O_3$, less than 20 nm thick with an optical density of 1.63. Above this is an orientation layer which is a polyimide layer about 30 nm thick and an optical density of 1.63.

DETAILED DESCRIPTION OF THE INVENTION

The liquid crystal display is characterized by the features that at least in the case of the first carrier plate:

the electrode has a thickness $d_e$, to which applies: $0 < d_e \leq 30$ nm or $(m\lambda/2n_e - 10)$ nm $\leq d_e \leq (m\lambda/2n_e + 10)$ nm, wherein $\lambda = 550$ nm, m = integer > 0, $n_e$ = index of refraction of the electrode, nm = nanometer, the base layer has an index of refraction $n_b$ and a thickness $d_b$, to which applies: $1.40 \leq n_b \leq 150$ and 20 nm $\leq d_b$ 50 nm or $(m\ 300/n_b - 20)$nm $\leq d_b \leq (m\ 300/n_b + 20)$nm, the remaining layers of the first layer system have indices of refraction $n_i$ and a total thickness $d_{sl-b}$ for which applies: $1.60 \leq n_i \leq 170$ and 20 nm $\leq d_{sl-b} \leq 70$ nm, and the uppermost layer ("orientation layer") of the first layer system aligns the adjacent liquid-crystal molecules.

Calculations and tests have shown in good agreement that with the liquid crystal type here, the reflections at the individual layer boundaries add up to a total reflection which is nearly of the same magnitude in the electrode areas as well as outside the electrodes. This effect contributes substantially to the fact that the non-switched electrode segments are no longer distinguished optically from the surroundings. Otherwise, the reflection factors are also very small; they are typically below a value of 3% and can also be reduced to values below 1% without difficulty. Attention then is given to the requirement that the degree of reflection is less than 1% at a single surface, namely at the transition between the carrier plate and the dielectric layer adjoining it. To this is added that the antireflection effect occurs if a relatively thin composite layer is used over the electrodes and thus, the display has good multiplexing properties (the less dielectric material there is between the conductive layer and the liquid-crystal layer, the larger the share of the applied switching voltage which drops across the liquid-crystal layer and can be utilized).

In cases where the quality of the optical finishing process must meet particularly stringent requirements, the carrier plates should further be provided with a second system of dielectric layers under the electrode or the first layer system. This additional system, which advantageously has an overall thickness of $\lambda/4$, basically means no extra effort, since inexpensive carrier plates are integrally coated with a protective layer which intercepts alkali ions emerging from the plate.

The invention will now be explained in greater detail by way of an embodiment example, making reference to the accompanying drawing.

The drawing shows in a schematized lateral cross section, a 7-segment numerical display of the liquid-crystal type. The cell proper contains a front carrier plate (front plate) 1, a rear support plate (rear plate) 2 and a reflector 3 arranged behind the rear plate. Both plates are tightly connected to each other via a frame 4 at a defined distance from each other. The chamber formed by the frame and the two substrates is filled with a liquid-crystal layer 6. Both plates carry on their surfaces facing each other several layers: a protective layer respectively 7 and 8; a conductive layer (continuous rear electrode 9 on the rear plate 2, several separately addressable segment electrodes 11 on the front plate 1); an insulating layer respectively 12 and 13; an intermediate layer respectively 14 and 16; and an orientation layer respectively 17 and 18. The liquid-crystal layer 6 consists of a nematic carrier with a chiral additive; it is oriented planar-cholesteric in the off condition and homeotropically and nematically in the on condition. The cell works with the so-called "phase-change" effect which is presented in detail, for instance, in U.S. Pat. No. 3,833,287.

In the present case, the details of the display are as follows:

The substrates consist of an ordinary sodium silicate glass with an index of refraction $n_t$ of 1.48. The protective layer is made of quartz or another $SiO_2$ modification; it has an optical density $n_s 2$ of 1.46 and a thickness of 140 nm. For the electrodes, an $In_2O_3/SnO_2$ alloy is chosen, which has an index of refraction $n_e$ of about 2.0 and is barely 30 nm thick.

The insulating layer consists of the same material as the protective layer and has a thickness of about 35 nm. On top of this layer there is an $Al_2O_3$ layer and on top of that layer, a polyimide layer. The aluminum oxide layer is somewhat thinner than 20 nm and has an optical density of about 1.63. The organic coating, which has an index of refraction of about 1.65, is about 30 nm thick and is rubbed on its surface making contact with the liquid crystal in order to orient the adjacent liquid-crystal molecules homogeneously, with a setting angle of a few degrees.

In the liquid-crystal mixture, the nematic carrier consists of a mixture of biphenylene which is doped with a 3% by weight of the chiral compound ZLI 811 sold by the Merck company.

The invention is not limited to the embodiment example shown. Thus, one can also put together completely different combinations within the scope of the given value ranges and vary the individual parameters relatively independently of each other. Apart from that, it is sufficient in many cases to coat only the plate provided with the segment electrodes in the manner described here. This applies particularly if the rear electrode occupies the entire display area and thus, no regions free of electrodes exist on the rear plate. The advantages of the invention apply even if the liquid-crystal display is equipped with polarizers.

There are claimed:
1. A liquid-crystal display with
   (1) a liquid-crystal layer enclosed by
   (2) two mutually parallel spaced-apart carrier plates which
   (3) carry electrically conductive coatings as electrodes on the surfaces of the two plates facing each other with at least one of the two carrier plates designated first carrier plate provided with
   (4a) several separately addressable electrodes, and on top thereof
   (4b) with a first layer system of several dielectric layers, the refraction indices of which have values smaller than 2.2 and the thicknesses of which are, at least in the case of the layers above the lowest layer designated base layer, under 200 nm,
      the combination therewith wherein at least in the first carrier plate
   (4c) the electrode has a thickness $d_e$, within the range according to $0 < d_e \leq 30$ nm, wherein nm = nanometer, (4d) the base layer has an index of refraction $n_b$ and a thickness $d_b$, within the ranges according to $1.40 \leq n_b \leq 1.50$ and $20 \text{ nm} \leq d_b \leq 50$, (4e) the remaining layers of the first layer system have indices of refraction $n_i$ and a total thickness of $d_{sl-b}$ according to $1.60 \leq n_i \leq 1.70$ and $20 \text{ nm} \leq d_{sl-b} \leq 70 \text{ nm}$ and (4f) the orientation layer which is the uppermost layer of the first layer system aligns the adjacent liquid-crystal molecules.

2. A liquid-crystal display with (1) a liquid-crystal layer enclosed by (2) two mutually parallel spaced-apart carrier plates which (3) carry electrically conductive coatings as electrodes on the surfaces of the two plates facing each other with at least one of the two carrier plates designated first carrier plate provided with (4a) several separately addressable electrodes, and on top thereof (4b) with a first layer system of several dielectric layers, the refraction indices of which have values smaller than 2.2 and the thicknesses of which are, at least in the case of the layers above the lowest layer designated base layer, under 200 nm, the combination therewith wherein at least in the first carrier plate (4c) the electrode has a thickness $d_e$, within the range according to $0 < d_e \leq 30$ nm, wherein nm=nanometer, (4d) the base layer has an index of refraction $n_b$ and a thickness $d_b$, within the ranges according to (m $300/n_b - 20$) nm $\leq d_b \leq$ (m $300/n_b + 20$)nm, wherein m=natural integer > 0, (4e) the remaining layers of the first layer system have indices of refraction $n_i$ and a total thickness $d_{sl-b}$ according to $1.60 \leq n_i \leq 1.70$ and $20 \text{ nm} \leq d_{sl-b} \leq 70 \text{ nm}$ and (4f) the orientation layer which is the uppermost layer of the first layer system aligns the adjacent liquid-crystal molecules.

3. A liquid-crystal display with (1) a liquid-crystal layer enclosed by (2) two mutually parallel spaced-apart carrier plates which (3) carry electrically conductive coatings as electrodes on the surfaces of the two plates facing each other with at least one of the two carrier plates designated first carrier plate provided with (4a) several separately addressable electrodes, and on top thereof (4b) with a first layer system of several dielectric layers, the refraction indices of which have values smaller than 2.2 and the thicknesses of which are, at least in the case of the layers above the lowest layer designated base layer, under 200 nm, the combination therewith wherein at least in the first carrier plate (4c) the electrode has a thickness $d_e$, within the range according to
(m $\lambda/2n_e - 10$)nm $\leq d_e \leq$ (m$\lambda/2n_e + 10$)nm wherein $\lambda = 550$ nm, m=natural integer > 0, $n_e$ = index of refraction of the electrode, and wherein nm=nanometer, (4d) the base layer has an index of refraction $n_b$ and a thickness $d_b$, within the ranges according to $1.40 \leq n_b \leq 1.50$ and $20 \text{ nm} \leq d_b \leq 50$, (4e) the remaining layers of the first layer system have indices of refraction $n_i$ and a total thickness $d_{sl-b}$ according to $1.60 \leq n_i \leq 1.70$ and $20 \text{ nm} \leq d_{sl-b} \leq 70 \text{ nm}$ and (4f) the orientation layer which is the uppermost layer of the first layer system aligns the adjacent liquid-crystal molecules.

4. A liquid-crystal display with (1) a liquid-crystal layer enclosed by (2) two mutually parallel spaced-apart carrier plates which (3) carry electrically conductive coatings as electrodes on the surfaces of the two plates facing each other with at least one of the two carrier plates designated first carrier plate provided with (4a) several separately addressable electrodes, and on top thereof (4b) with a first layer system of several dielectric layers, the refraction indices of which have values smaller than 2.2 and the thicknesses of which are, at least in the case of the layers above the lowest layer designated base layer, under 200 nm, the combination therewith wherein at least in the first carrier plate (4c) the electrode has a thickness $d_e$, within the range according to (m $\lambda/2n_e - 10$)nm $\leq d_e \leq$ (m $\lambda/2n_e + 10$)nm wherein $\lambda = 550$ nm, m=natural integer > 0, $n_e$ = index of refraction of the electrode, and wherein nm=nanometer, (4d) the base layer has an index of refraction $n_b$ and a thickness $d_b$, within the range according to (m $300/n_b - 20$)nm $\leq d_b \leq$ m $300/n_b + 20$)$n_b$ wherein m=natural integer > 0, (4e) the remaining layers of the first layer system have indices of refraction $n_i$ and a total thickness $d_{sl-b}$ according to $1.60 \leq n_i \leq 1.70$ and $20 \text{ nm} \leq d_{sl-b} \leq 70 \text{ nm}$ and (4f) the orientation layer which is the uppermost layer of the first layer system aligns the adjacent liquid-crystal molecules.

5. A liquid-crystal display according to claim 1 or claim 2 or claim 3 or claim 4, wherein the carrier plate has an index of refraction $n_t$, according to $1.40 \leq n_t \leq 1.60$.

6. Liquid-crystal display according to claim 1 or claim 2 or claim 3 or claim 4, wherein the carrier plate has an index of refraction $n_t$, according to $1.40 \leq n_t \leq 1.60$, wherein the following indices and thicknesses are according to $1.40 \leq n_t \leq 1.50$; $1.95 \leq n_e \leq 2.05$; $25 \text{ nm} \leq d_e \leq 30$ nm; $1.44 \leq n_b \leq 1.48$; 28 nm $\leq d_b \leq 45$ nm; and 25 nm $\leq d_{sl-b} \leq 40$ nm.

7. A liquid-crystal display according to claim 1 or claim 2 or claim 3 or claim 4, wherein the carrier plate consists of glass, the conductive layer of an $In_2O_3/Sn_2O_2$ alloy, the base layer of $SiO_2$ and the orientation layer of a polyimide wherein the carrier plate has an index of refraction $n_t$, according to $1.40 \leq n_t \leq 1.60$, wherein the following indices and thicknesses are according to $1.40 \leq n_t \leq 1.50$; $1.95 \leq n_e \leq 2.05$; 25 nm $\leq d_e \leq 30$ nm; $1.44 \leq n_b \leq 1.48$; 28 nm $\leq d_b \leq 45$ nm; and 25 nm$_1 \leq d_{sl-b} \leq 40$ nm.

8. A liquid-crystal display according to claim 1 or claim 2 or claim 3 or claim 4, wherein a second system of dielectric layers is disposed between the first carrier plate and the separately addressable electrodes.

9. A liquid-crystal display according to claim 1 or claim 2 or claim 3 or claim 4, wherein a second system of dielectric layers is disposed between the first carrier plate and first layer system.

10. A liquid-crystal display according to claim 1 or claim 2 or claim 3 or claim 4, wherein a second system of dielectric layers is disposed between the first carrier plate and the separately addressable electrodes, wherein the carrier plate consists of a glass, the second layer system of a silicon dioxide layer, the electrode of an $In_2O_3/SnO_2$ alloy, the base layer of silicon dioxide, the orientation layer of a polyimide layer; and a layer of aluminum oxide is further disposed between the base layer and the orientation layer.

11. A liquid-crystal display according to claim 1 or claim 2 or claim 3 or claim 4, wherein a second system of dielectric layers is disposed between the first carrier plate and first layer system, wherein the carrier plate consists of a glass, the second layer system of a silicon dioxide layer, the electrode of an $In_2O_3/SnO_2$ alloy, the base layer of silicon dioxide, the orientation layer of a polyimide layer; and a layer of aluminum oxide is further disposed between the base layer and the orientation layer.

* * * * *